(12) United States Patent
Maiyuran et al.

(10) Patent No.: US 8,065,555 B2
(45) Date of Patent: Nov. 22, 2011

(54) SYSTEM AND METHOD FOR ERROR CORRECTION IN CACHE UNITS

(75) Inventors: Subramaniam Maiyuran, Goldriver, CA (US); Varghese George, Folsom, CA (US); Vladimir Pentkovski, Folsom, CA (US); Sanjib Sarkar, Folsom, CA (US); Marina Sherman, Nesher (IL)

(73) Assignee: Intel Corporation, Santa Clara, CA (US)

( * ) Notice: Subject to any disclaimer, the term of this patent is extended or adjusted under 35 U.S.C. 154(b) by 536 days.

(21) Appl. No.: 11/363,150

(22) Filed: Feb. 28, 2006

(65) Prior Publication Data

US 2007/0226589 A1 Sep. 27, 2007

(51) Int. Cl.
*G06F 11/00* (2006.01)
(52) U.S. Cl. .......................................................... 714/6
(58) Field of Classification Search .............. 714/6, 758, 714/754, 768, 764, 799; 712/227
See application file for complete search history.

(56) References Cited

U.S. PATENT DOCUMENTS

| | | | |
|---|---|---|---|
| 5,701,313 A * | 12/1997 | Purdham | 714/764 |
| 5,860,112 A | 1/1999 | Langendorf et al. | |
| 6,038,693 A | 3/2000 | Zhang | |
| 6,668,015 B1 * | 12/2003 | Kranawetter et al. | 375/240.12 |
| 6,859,904 B2 * | 2/2005 | Kocol et al. | 714/764 |
| 7,676,728 B2 * | 3/2010 | Resnick et al. | 714/764 |
| 7,865,769 B2 * | 1/2011 | Luick | 714/10 |
| 2002/0157056 A1 * | 10/2002 | Chaudhry et al. | 714/763 |
| 2002/0199151 A1 * | 12/2002 | Zuraski, Jr. | 714/763 |
| 2007/0101238 A1 * | 5/2007 | Resnick et al. | 714/763 |

* cited by examiner

*Primary Examiner* — Robert W. Beausoliel, Jr.
*Assistant Examiner* — Amine Riad
(74) *Attorney, Agent, or Firm* — Blakely, Sokoloff, Taylor & Zafman LLP

(57) ABSTRACT

A method and a processor may include storing a first set of data in a data array in a cache unit substantially concurrently to reading a second set of data from the data array, and using the second set of data to generate error correction data corresponding to the first set of data. A method or processor may include reading an entry from a cache in a processor and executing two or more error detection mechanisms on the entry substantially concurrently.

28 Claims, 5 Drawing Sheets

SYSTEM AND METHOD FOR ERROR CORRECTION IN CACHE UNITS

FIELD OF THE INVENTION

The present invention relates to error correction in local storage units, such as cache units in microprocessors.

BACKGROUND OF THE INVENTION

Recent technological trends support decreasing the physical dimensions and applied voltage of storage devices, which may increase the probability of errors in such devices, such as cache arrays or memory devices. A need exists for efficient error correction mechanisms for such devices.

Various methods and systems to integrate error correction mechanisms into processor caches such as L1 caches are known. Error correction (EC) bit generation, and error correction and detection mechanisms often overlap with main processor pipelines. For example, data storage and error correction update may occur in a single pipeline that is expensive and inefficient. Many current EC integration schemes involve a read-modify-write (RMW) mechanism. EC integration schemes that involve a RMW mechanism may stall or interrupt writing a set of data from the cache unit if there is a substantially concurrently read request for the data before the data is fully written. Such schemes may add extra time or computational cycles to execute a write operation. The L1 cache array is highly sensitive to timing and extra computational cycles may degrade performance. A need exists for integrating an efficient error detection and/or correction mechanism into cache units.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or a similar electronic computing device, that manipulates and/or transforms data represented as physical, such as electronic, quantities within the computing system's registers and/or memories into other data similarly represented as physical quantities within the computing system's memories, registers or other such information storage, or display devices. Further, "plurality" may be used throughout the specification to describe two or more components, devices, elements, parameters and the like.

Figure 1:
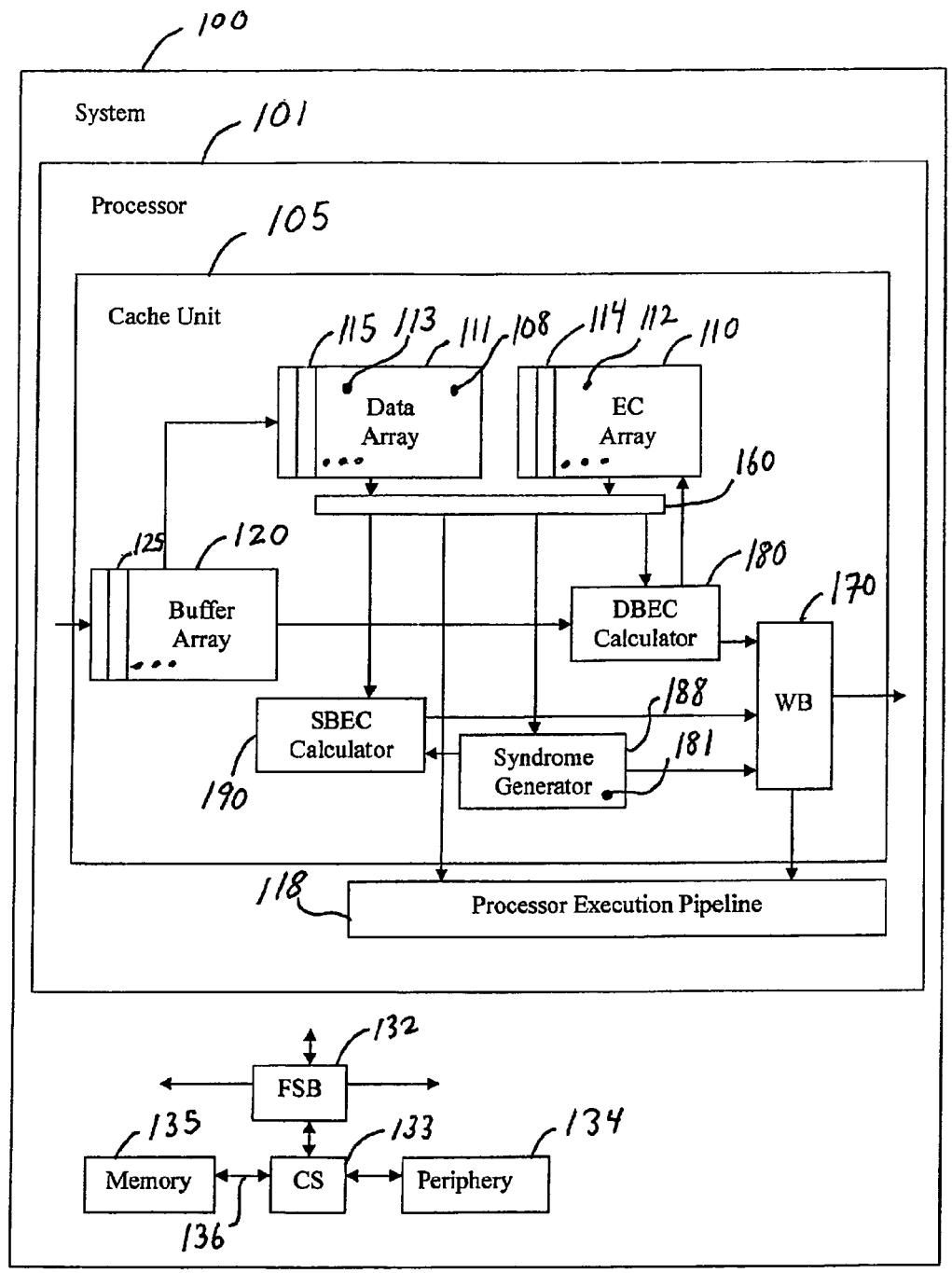
FIG. 1 is a schematic illustration of a computing system including a processor in accordance with one demonstrative embodiment of the present invention.

Reference is made to FIG. 1, which schematically illustrates a computing system 100 in accordance with one demonstrative embodiment of the present invention. System 100 may include a processor 101 which may include, for example, a central processing unit (CPU), a digital signal processor (DSP), a microprocessor, a host processor, a plurality of processors, a controller, a chip, a microchip, or any other suitable multi-purpose or specific processor or controller. Processor 101 may include a processor execution pipeline(s) 118 which may include, for example, fetch, decode, execute and retire mechanisms. Other pipeline components or mechanisms may be used.

According to some demonstrative embodiments of the invention, system 100 may also include a shared bus, such as a "front side bus" (FSB) 132. For example, FSB 132 may be a CPU data bus able to carry information between processor 101, and other devices of computing system 100. For example, FSB 132 may connect between processor 101 and a chipset (CS) 133. Although the invention is not limited in this respect, chipset 133 may include one or more motherboard chips, e.g., a "northbridge" and a "southbridge", and/or a "firmware hub". Chipset 133 may include connection points for additional buses and/or devices of computing system 100.

According to some demonstrative embodiments of the invention, system 100 may include one or more peripheral devices 134, which may be connected to chipset 133. For example, peripheral device 134 may include an input unit, e.g., a keyboard, mouse, touch-pad, or other suitable pointing or input device; an output unit, e.g., a cathode ray tube (CRT) monitor, liquid crystal display (LCD) monitor, or other suitable monitor or display. In some embodiments the aforementioned output devices may be coupled to chipset 133, such as in the case of a system containing a firmware hub. In some embodiments, peripheral device 134 may include a storage unit, e.g., a hard disk drive, a floppy disk drive, a compact disk (CD) drive, a CD-Recordable (CD-R) drive, or other suitable removable and/or fixed storage unit.

According to some demonstrative embodiments of the invention, system 100 may include a memory 135, e.g., a system memory connected to chipset 133 via a memory bus 136. Memory 135 may include, for example, a random access memory (RAM), a read only memory (ROM), a dynamic RAM (DRAM), a synchronous DRAM (SD-RAM), a flash memory, a volatile memory, a non-volatile memory, a cache memory, a buffer, a short term memory unit, a long term memory unit, or other suitable memory units or storage units. System 100 may additionally include other suitable hardware components and/or software components.

In some embodiments, system 100 may include or may be, for example, a computing system, e.g., a personal computer, a desktop computer, a mobile computer, a laptop computer, a notebook computer, a terminal, a workstation, a server computer, a personal digital assistant (PDA) device, a tablet computer, a network device, a micro-controller, a cellular phone, a camera, or any other suitable computing and/or communication device.

According to some demonstrative embodiments of the invention, processor 101 may include a local cache unit 105. Common elements of processor 101 and cache unit 105 are not shown for clarity. The processor 101 may contain cache unit 105 internal to processor 101, for example, a local or level 1 (L1) cache. While an L1 cache unit 105 is discussed, other types of cache units and cache locations may be used with embodiments of the present invention.

Cache unit 105 may include, for example, data array 111 that may be divided into data ways 115 and possibly data lines and may store data bits 113 that may correspond to data in memory banks outside the cache unit 105. An intermediate buffer or buffer array 120 may read data from outside the cache unit 105. Buffer array 120 may be divided into buffer ways 125.

Cache unit 105 may include multiple error detection and correction (EC) mechanisms that may operate independently and generate, store and use error correction data is separate elements, for example in cache unit 105 or in processor 101 outside of cache unit 105. Multiple EC mechanisms may include a double bit error detection or correction (DBEC) mechanisms and a single bit error detection or correction (SBEC) mechanism. Double bit error correction bits 112 may correspond to a set of data bits 113 in data bank 111. Single bit error correction bits 108 may correspond to a set of data bits 113 in data array 111.

Cache unit 105 may include one or more multiplexer units 160 for extracting data from one or more storage units, for example, a set of data bits 113 from data array 111, corresponding DBEC bits 112 from EC array 110 and corresponding SBEC bits 108 from a suitable storage unit, for example, data array 111. A set of data bit 113 may be read and filtered, for example, via multiplexer 160 and read by DBEC calculator 180. DBEC calculator 180 may compute and generate DBEC bits 112 that may correspond to the set of data bits 113. EC array 110 may store DBEC bits 112. DBEC bits 112 may be, for example, (error-correction code) ECC bits. EC array 110 may be divided into DBEC ways 114. SBEC bits 108 may be computed and generated by any suitable unit. SBEC bits 108 may be, for example, parity bits. SBEC bits 108 may be stored in data array 111 or in EC array 110 or any other suitable storage space. In other embodiments, SBEC bits 108 or DBEC bits 112 may be generated, read, written, or used in operations or mechanisms, but may not be substantially permanently stored.

A set of data bits 113 and their corresponding SBEC bits 108 may be filtered, for example, via multiplexer 160 and read by SBEC calculator 190. SBEC calculator 190 may use the set of data bits 113 and corresponding SBEC bits 108 to detect single bit errors in the data set. If an error is detected, syndrome generator 188 may generate corresponding syndrome bits 181 that may be used to correct the single bit errors.

The SBEC mechanism may include a mechanism for detecting and correcting errors in data read from storage in cache unit 105 or correcting errors in data that may relate or correspond to erroneous data. The SBEC mechanism may include, for example, syndrome generator 188 that may compute and generate error correcting bits, for example, syndrome bits 181 and which may be located in cache unit 105. Syndrome generator 188 may use or read a set of data bits 113 and their corresponding DBEC bits 112, which may be filtered from the data in their respective storage units, for example, via multiplexer 160. The SBEC mechanism may use syndrome bits 181 and may be executed by a program or operation or mechanism inside or outside cache unit 105, for example, in processor 101 outside of cache unit 105, for example, by a micro code assist (MCA) mechanism. The SBEC mechanism may include other components.

The DBEC mechanism may operate in conjunction with and substantially concurrently to a SBEC mechanism, and may include a DBEC calculator 180 that may generate DBEC bits 112, which may be stored in EC array 110. The DBEC mechanism may read data stored in data array 111, intermediate buffer 120, EC array 110, or another suitable storage site. When a unit requests to read or use data from the data bank 111, a set of data bits 113 and corresponding DBEC bits 112 may be filtered via multiplexer 160 and read by syndrome generator 188, which may generate corresponding syndrome bits 181. Syndrome bits 181 may detect double bit errors in the set of data bits 113. The DBEC mechanism may include other components.

Cache unit 105 may include a write back (WB) mechanism 170 that may write data from cache unit 105, for example, via a bus 136 to various systems, devices, programs, operations or memory banks outside cache unit 105. Cache unit 105 may include multiple buses, for example, one or more for writing data from cache unit 105 to processor 101 or processor execution pipeline(s) 118, one or more for writing data that includes error detection or correction data, one or more for writing modified data to external memory banks, and one or more for reading data from external memory banks. Cache unit 105 may include other components and functionality.

Figure 2:
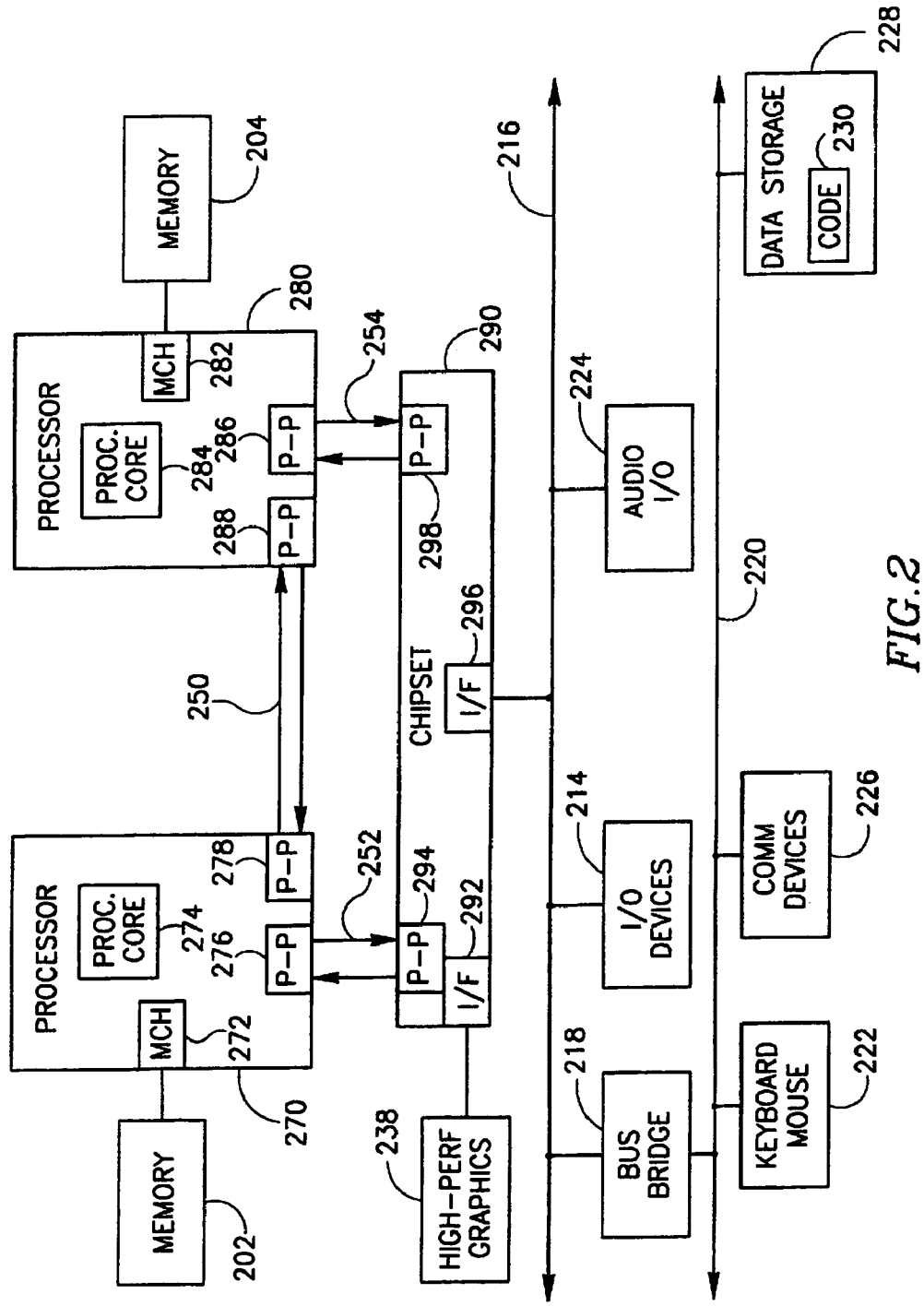
FIG. 2 is a schematic illustration of a computing system including a processor in accordance with another demonstrative embodiment of the present invention.

Reference is made to FIG. 2, which schematically illustrates a computing system 200 in accordance with another demonstrative embodiment of the invention.

According to some demonstrative embodiments of the invention, system 200 may include, for example, a point-to-point busing scheme having one or more processors, e.g., processors 270 and 280; memories, e.g., memories 202 and 204 which may be external to processors 270 and 280; and/or input/output (I/O) devices, e.g., devices 214, interconnected by one or more point-to-point interfaces. Memories 202 and 204 may be for example dynamic RAM (DRAM) or static RAM (SRAM), or may be other types of memories. Processors 270 and/or 280 may include processor cores 274 and 284, respectively. Processor cores 274 and/or 284 may include cache unit 105, processor pipeline(s) 118, and any other suitable elements as are described with reference to FIG. 1.

According to some demonstrative embodiments of the invention, processors 270 and 280 may also include respective local memory channel hubs (MCH) 272 and 282, e.g. to connect with memories 202 and 204, respectively. Processors 270 and 280 may exchange data via a point-to-point interface 250, e.g., using point-to-point interface circuits 278, 288, respectively. Processors 270 and/or 280 may exchange data with a chipset 290 via point-to-point interfaces 252, 254, e.g., using point to point interface circuits 276, 294, 286, and 298. Chipset 290 may also exchange data with a high-performance graphics circuit 238 via a high-performance graphics interface 292. Chipset 290 may also exchange data with a bus 216 via a bus interface 296. Input/output devices 214 may include, according to some embodiments, low performance graphics controllers, video controllers, and/or networking controllers, e.g., as are known in the art. System 200 may also include, according to some demonstrative embodiments, another bus bridge 218, which may be used, for example, to permit data exchanges between bus 216 and a bus 220. Bus 220 may in some embodiments be a small computer system interface (SCSI) bus, an integrated drive electronics (IDE) bus, or a universal serial bus (USB) bus, e.g., as are known in the art. Additional I/O devices may be connected to bus 220. For example, system 200 may also include, keyboard and/or a cursor control devices 222, e.g., a mouse; an audio I/O 224; communications devices 226, e.g., including modems and/or network interfaces; and/or data storage devices 228, e.g., to store software code 230. In some embodiments, data storage devices 228 may include a fixed magnetic disk, a floppy disk drive, an optical disk drive, a magneto-optical disk drive, a magnetic tape, or non-volatile memory including flash memory.

Error correction (EC) mechanisms integrated into cache units in the prior art may include in-line execution that may be inefficient. In accordance with an embodiment of the present invention, EC mechanisms in cache unit 105 may include multiple, substantially concurrent pipelines or operations, for example, multiple error correction execution pipelines. Multiple EC mechanisms may be used in combination for error correction and/or detection in cache unit 105, for example, of data in data array 111, without significantly adding extra cycles to processor computations that may result from in-line detection and correction.

EC mechanisms in cache unit 105 may be executed in pipelines that may be distinct from processor execution pipeline(s) 118.

Computing system 100 may include multiple substantially distinct EC mechanisms. Substantially distinct EC mechanisms may each include distinct elements, may include one or more elements that may be stored separately from the other EC mechanisms, may execute in pipelines that include distinct elements or may execute substantially concurrently to each other. Substantially concurrently execution of EC mechanisms may include each EC mechanism executing in a substantially distinct pipeline or pipelines, or executing one EC mechanism independently of the timing or result of the other, or multiple EC mechanisms executing completely or partially overlapping in time. In one embodiment, the result of an EC mechanism may affect the execution of other EC mechanisms.

Each EC mechanism may include multiple operations. Operations may include an EC bit generation mechanism, for example, reading data from storage, for example, from cache unit 105, generating corresponding EC bits for that data, and storing those EC bits, for example in cache unit 105. Operations may include an error detection mechanism, for example, reading data and corresponding EC bits from storage, for example, each from the same or different storage units in cache unit 105, generating EC bits from the data, comparing the EC bits with the data and, as a result of the comparison, determining whether the data is erroneous. At the time of error detection, the error detection mechanism may include computing or generating bits for data that may be similar to error correction bits that correspond to the data and may include some or all of the elements of the error correction bit generation mechanism. Those bits may not be stored and are typically only used for comparison. The error detection mechanism may compare those bits to corresponding error correction bits that may be read from storage.

In one embodiment, the error correction bit generation mechanism may execute before the error detection mechanism. In another embodiment, the error correction bit generation mechanism may execute substantially concurrently to the error detection mechanism, for example, comparison by the error detection mechanism may execute before EC bit storage and therefore before completion of the EC bit generation mechanism. Operations may include correcting errors, reporting, correcting, modifying or updating erroneous data or corresponding data, for example in memory external to cache unit 105, modifying operations, mechanisms or systems that may use erroneous data or corresponding data, for example, processor pipeline(s) 118 or other EC mechanisms, any other suitable related operations, or any combination of these operations.

The EC mechanisms for data stored in cache unit 105 may be located in part or in full in cache unit 105 or in processor 101 or in any other suitable location or in any combination of suitable locations, for example, in processor 101 outside of cache unit 105.

Multiple EC mechanisms may function in cache unit 105 of processor 101, for example, a single bit error correction (SBEC) mechanism and a double bit error correction (DBEC) mechanism. Multiple EC mechanisms may be used in conjunction with one another, so that each mechanism may include detecting or correcting substantially distinct errors. The multiple EC mechanisms may also detect and correct substantially similar errors. For example, one EC mechanism may detect and correct single bit errors in a data set and another EC mechanism may detect and correct double bit errors in a substantially similar data set.

In one embodiment, an EC mechanism may include, for example, SBEC and DBEC mechanisms, which may be used in conjunction. An EC mechanism may include substantially concurrent execution of multiple EC bit generation mechanisms, for example, SBEC bit 108 and DBEC bit 112 generation mechanisms, multiple error detection mechanisms for example, single and double bit error detection mechanisms, and multiple mechanisms for correcting erroneous data, for example, the SBEC mechanism and DBEC mechanism.

A SBEC mechanism may include SBEC bits 108, which may be used to check for single bit errors. A DBEC mechanism may include DBEC bits 112 to check for double bit errors. A SBEC mechanism may or may not be computationally more efficient than a DBEC mechanism. DBEC bits 112 may correspond to a set of data bits 113 in the data array 111 and may be stored as DBEC bits 112 in EC array 110. SBEC bits 108 may be stored in cache unit 105, for example, in data array 111, for example, in the same data way 115 where the set of data bits 113 that the SBEC bits 108 correspond to are stored. In some embodiments, SBEC bits 108 that may correspond to a set of data bits 113 may be stored in the EC array 110. For example, SBEC bits 108 may be stored in the same EC way 114, where the DBEC bits 112 may be stored, that may correspond to the same set of data bits 113. In another embodiment of the present invention the SBEC bits 108 may be stored in a separate array in the cache unit 105, outside the data array 111 and the EC array 110 or in any other suitable storage space. SBEC bits 108 may correspond to a set of data bits 113 or a data way 115 that may contain the set of data bits 113 that the SBEC bits 108 correspond to by an address, for example, a linear address, or by a certain storage placement. For example an association may be made by storing a SBEC bit 108 in the same data way 115 of the data array 111 where the set of data bits 113 to which it corresponds may be stored, or by a tag or any other suitable means of identification. SBEC bits 108 may be used by a SBEC mechanism to detect and report one bit errors.

In a demonstrative embodiment of the present invention DBEC bits 112 may be stored separately from the set of data bits 113 to which they correspond, outside the data array 111. The DBEC bits 112 may be stored in a separate array, for example, in an EC array 110. The EC array 110 and the data array 111 may have the same granularity, for example, 7 EC bits 112 may correspond to 4 data bytes. There may be a correspondence between DBEC ways 114 and data ways 115. For example, there may be a one-to one correspondence between DBEC bits 112 or DBEC ways 114 and a set of data bits 113 or data ways 115 or another suitable correspondence. EC array 110 and data array 111 may be constructed to accommodate such a correspondence. Other numbers of ways and other numbers of bytes may be used.

The cache unit 105 may include a separate buffer array 120, for example, a store hit buffer. Data that enters the cache unit 105 may be written to the buffer array 120. The buffer array 120 may be constructed with the same granularity as the data array 111. The buffer array 120 may be divided into buffer ways 125 and there may be the same number of buffer ways 125 as data ways 115. The buffer ways 125 may have the same width or number of bytes per way and may have the same number of bits per byte as do the data ways 115. There may be a correspondence, for example a one-to-one correspondence, or any other suitable correspondence, between buffer ways 125 and data ways 115. There may be any such suitable correspondence between buffer ways 125 and EC ways 114, for example the same correspondence that may exist between buffer ways 125 and data ways 115. The EC array 110 and the buffer 125 may both be constructed with the same granularity, for example, they may both have the same number of ways and they may both have the same number of bytes per way, and may have the same number of bits for each byte. Other structures for such input buffers may be used.

Once data enters cache unit 105, for example, via the buffer array 120, the data may be stored or updated in various manners that may depend on the data type. The data may correspond to a data way 115, where it may erase or overwrite or modify the old data previously stored in that data way 115. The data that enters the cache unit 105 may be, for example, new data (e.g., taken from memory) or data that is a modified form of data that is currently stored in the data array 111 (e.g., altered by the execution pipeline(s) 118). Other types of data may be written to cache unit 105. The data, for example, complete or full store data, may fill the width of a fixed data block, for example, data way 115 when it is written to cache unit 105. Complete data may be stored in an unaltered form as a full data block in buffer array 120 and then may be written as a set of data bits 113 to the data array 111 where they may be stored. Complete data may have EC bits generated and stored at the time of the storing of the complete data; however other EC methods or timing schemes for complete data may be used.

The data that enters the cache unit 105 may be partially modified from some or all of the data bits 113 of a data block that is stored in the data bank 111. The partially modified data may or may not fill the width of a fixed data block, for example, data way 115. If the partially modified data is the width of data way 115, it may be considered complete data and may be stored as new data. If the partially modified data does not fill or partially fills the width of a fixed data block, for example, data way 115, it may be referred to as, for example, partial or incomplete data. The incomplete data may be inserted into a data block so that the data block is the width of a data way 115 to form a complete data block. For example, the incomplete data may be attached to any suitable string of data bits such as filler bits that may have no significance, that may be used to mark the insertion, or that may have any suitable significance. This insertion may be executed before or after the data is stored in the buffer array 120. Once the data is inserted into a data block that is the same width as the data way 115, the data may be stored as a set of data bits 113, where the modified data bits overwrite the set of data bits 113 from which they were modified and the unmodified portion of the data block remains unaltered. The bits attached to the incomplete data during insertion may be, for example, discarded. Error correction bits, for example, SBEC bits 108 and DBEC bits 112 may be generated for the newly stored or updated set of data bits 113.

Multiple EC mechanisms may function at least partially in cache unit 105 of processor 101. In one embodiment, multiple EC mechanisms may include at least a SBEC mechanism and a DBEC mechanism. Other EC mechanisms may be used. A SBEC mechanism and a DBEC mechanism may be used in conjunction with one another, so that each mechanism may include detecting or correcting distinct or similar types of errors in substantially similar data. For example, the SBEC mechanism may detect and correct single bit errors in a data set and the DBEC mechanism may detect and correct double bit errors in a substantially similar data set.

A SBEC mechanism and a DBEC mechanism may be used in conjunction or in parallel such that the execution of each process occurs in separate pipelines and includes separate components, for example, different error correction bits. Such execution need not be in-line, and may be coordinated. The DBEC mechanism and the SBEC check mechanism may be used in conjunction, for example, to perform error correction for data that may be read in the cache unit 105, for example, read from the data bank 111. For example, an entry may be read from a cache 105 in a processor 101. The DBEC mechanism and the SBEC check mechanism may be used in conjunction, for example, to generate SBEC bits 108 and DBEC bits 112 that may correspond to substantially similar data in cache unit 105, for example, in data array 111. The SBEC and DBEC mechanisms may be used in conjunction for error detection, for example, in the cache unit 105, and may be used in conjunction for error correction without adding extra cycles to processor 101 computations that may result from in-line detection and correction.

The SBEC mechanism and the DBEC mechanism may coordinate their functions. This coordination may include communicating, signaling or using the same data, for example, DBEC bits. The DBEC mechanism uses DBEC bits 112 for double bit error detection, while the SBEC mechanism may use DBEC bits 112 along with a set of corresponding data bits 113 to generate syndrome bits 181 for correcting single bit errors. One mechanism may modify the function of another, for example, to skip a step or to aid in error correction. The interaction between the SBEC mechanism and the DBEC mechanism may be used to increase efficiency, for example, by having a mechanism skip unnecessary steps. For example, a SBEC mechanism may detect single bit errors in data more efficiently than a DBEC mechanism. In one embodiment, if the SBEC mechanism detects a single bit error in data, the SBEC mechanism stops the DBEC mechanism until the single bit error is corrected. Since the SBEC mechanism may modify or alter or correct the data with single bit errors and thus, rewrite the data, the DBEC mechanism need not attempt to correct data that will be rewritten. The DBEC mechanism may stall or modify its function until corrected or modified data is rewritten to the cache unit 105. The DBEC mechanism may then operate on the single bit corrected data. This may prevent unnecessary or repetitive operations by the DBEC mechanism and may defer certain error correction operations to the less computationally intensive SBEC mechanism.

The action or execution of either of the SBEC or DBEC mechanism may not depend on the action of the other. The timing of the mechanisms may overlap, which may prevent compromised performance that may occur if these mechanisms are executed in sequence. In some embodiments the execution of the SBEC mechanism and the DBEC mechanism does not occur at exactly the same time since the timing of the SBEC mechanism and the DBEC mechanism is asynchronous. For example, if the SBEC mechanism is less computationally intensive and is executed faster than the DBEC mechanism, then although their processes may overlap in time, their actions may not be fully synchronous. However, the SBEC mechanism and the DBEC mechanism may execute at overlapping times or substantially concurrently. In one embodiment multiple error detection mechanisms may execute substantially concurrently on an entry or data read from a cache in a processor.

Error correction bits may be generated on a write to the cache unit 105 for the purpose of later comparison and error detection, or on a read from the cache unit 105 for such comparison. The SBEC and DBEC mechanisms may generate error correction bits that may correspond to a set of data bits 113 in the data array 111, for example, SBEC bits 108 and DBEC bits 112. The SBEC mechanism and the DBEC mechanism may generate their respective error correction bits independently or in separate pipelines or so that the execution of generating SBEC bits 108 does not depend on the execution of generating DBEC bits 112. The SBEC bits 108 may be generated inside the cache unit 105. The execution of SBEC bits 108 generation may occur at a time before or after or at a time that overlaps the execution of DBEC bits 112 generation.

The DBEC mechanism may generate, inside the cache unit 105, DBEC bits that correspond to a set of data bits 113 in the data array 111. This process may proceed in various manners that may depend on the data type or the form of the data written to the data array 111 upon entering the cache unit 105.

Complete or full store data may enter the cache unit 105 via an intermediate buffer, for example, a buffer array 120, and may be stored in an unaltered form as a set of data bits 113 in the data array 111. Since the DBEC mechanism may generate DBEC bits 112 that correspond to a full data block, for example, a line, section or data way 115 of data array 111, the DBEC mechanism may need to read that entire data block from, for example data array 111 or intermediate buffer 120, in order to generate the corresponding DBEC bits 112. In one embodiment, the DBEC mechanism may read the entire data block from the intermediate buffer 120, concurrently or substantially concurrently to when the data block is written, updated or stored in the data array 111. The DBEC bits 112 generated that correspond to the data stored in the data array 111 may be stored in for example EC array 110.

The DBEC bits 112 may be generated and/or stored after the data to which they correspond is stored. If data is read from data array 111 for use outside the cache unit 105, for example, in the processor pipeline(s) 118, there may be a period of time when there are no accurate corresponding DBEC bits 112 in storage, for example, EC array 110. This situation may be detected by the DBEC mechanism and the DBEC bits 112 may be written to the error correction mechanism at a time when they are needed, which may be before or during the time when they are written to storage, for example, EC array 110.

The data written to data array 111 may be partial store or partially modified data, where the data is incomplete and, for example, inserted into a data block. The data block may contain new data that was modified from data currently stored in the data array 111. When the partially modified data enters the data array 111 to be stored, it may be written to an intermediate buffer or buffer array 120 before or after it is inserted into data bank 111.

When storing partial store or partially modified data, a set of data bits 113 and corresponding DBEC bits 112 may be updated substantially concurrently. The DBEC bit 112 generation mechanism may, for example, be in cache unit 105.

DBEC bits 112 may correspond to full size data blocks (e.g. the width of a data way 115) in storage in the cache unit 105, for example, in data array 111. Thus, the DBEC bits 112 generation mechanism may need to read the full data block to produce DBEC bits 112. In such a case, the modified and partial data (e.g., less than the width of a data way 115) may be written from the buffer array 120 to data bank 111 substantially concurrently to when the full block of data, corresponding to the width of data way 115 is read by the DBEC mechanism. The full block of data read from data bank 111 may include data bits that were not in the modified and partial data, data bits that are needed to create error correction bits, for example, syndrome bits 181. The DBEC mechanism may read the modified data, for example, from buffer array 120 and extract the modified portion of the inserted data block (e.g. the same modified portion that is updated in the data bank 111) while it reads the unmodified portion of the data block from the data array 111. The read from data array 111 may include the full data block; in such case the read may include new data, or if old data is included it may be read from buffer array 120. The write of the modified data to the data array 111 and the read of the unmodified data by the DBEC mechanism may occur substantially concurrently.

A first set of data may be stored in a data array in a cache unit, substantially concurrently to reading another set of data, where the second set of data may be used to generate error correction data corresponding to the first set of data. The first set of data may include partially modified data and the second set of data may include the unmodified portion of the partially modified data from the data array. Typically, the error correction data is DBEC bits 112, for example, ECC data. The error correction data may be stored outside a data array and inside a cache unit. In another embodiment, the error correction data may be SBEC bits 108.

The unmodified data from the data array 111 and the modified data from the buffer array. 120 may be sent to the DBEC calculator 180. The DBEC calculator 180 may merge the modified and unmodified data to form a data block that corresponds to or includes the data of the newly updated data block in the data bank 111. The DBEC calculator 180 may calculate corresponding DBEC bits 112. The DBEC bits 112 may be stored in, for example, the EC array 110. EC bits 112 may be stored elsewhere.

The DBEC mechanism or another suitable EC bit generation mechanism may read data for generating DBEC bits 112 and/or generate DBEC bits 112 corresponding to a set of data bits 113, substantially concurrently to the storage or update of those data in cache unit 105.

Embodiments of the present invention may use signals present in existing systems to effect cache access such as substantially concurrent read and write of data. In some embodiments additional signal lines and capability may be added, for example signals to read unmodified data from the data array 111.

Such substantially concurrent reading and writing may for example avoid delays caused by a RMW mechanism that may be caused by the read mechanism interrupting the write mechanism. Since an EC bit generation system such as the DBEC mechanism may read new data from the buffer array 120 and processor 101 may read new data from the data bank 111, processor 101 read requests typically do not interrupt the DBEC mechanism as may occur in prior art systems.

If the updated data that enters the cache unit 105 is complete, errors in the old data block that the new data is written to, may be innocuous, since the DBEC bit generation mechanism uses new data and erases old data. If the updated data that enters the cache unit 105 is incomplete, errors in the modified portion of the old data block, may be innocuous, since the DBEC bit generation mechanism may only read the unmodified portion of the old data block in a substantially concurrent read/write mechanism.

However, in a partial store operation, if there are errors in the unmodified portion of the old data and these errors are not corrected, for example, before being read to generate DBEC bits 112 in a substantially concurrent read/write operation, erroneous data may be generated or stored, for example, erroneous DBEC bits 112 or syndrome bits 181. When the partial store data, derived from incomplete data, is written to data array 111, the data that previously occupied the block may be overwritten or erased. For example, for a partial store, if the unmodified portion of the old data is erroneous, it may be read and used to generate erroneous DBEC bits 112, for example, during a substantially concurrent read/write operation. DBEC bits 112 may be required to generate syndrome bits 181. If DBEC bits 112 are erroneous, then syndrome bits 181 may also be erroneous. Syndrome bits 181 may be required by the SBEC and DBEC mechanism to differentiate single and double bit errors and may be used to correct single bit errors. In a partial store operation, errors in the old unmodified portion of an update block in data array 111 may be passed along to syndrome generator 188.

To prevent the use of erroneous data, the unmodified portion of the old data may be checked for errors. The unmodified portion of a partial or incomplete store is not the full size of a data block. Since the DBEC mechanism may only generate DBEC bits 112 that correspond to a full size data block, the DBEC mechanism may check for errors. However, since the SBEC mechanism may generate SBEC bits 108 that correspond to any number of bytes, the SBEC mechanism may check for single bit errors in the unmodified portion of the old data that is read. In one embodiment, the SBEC bits 108 may be based on a byte count of the data they correspond to. For example, SBEC bits 108 may be parity bits.

In accordance with an embodiment of the invention, when reading an incomplete data block from cache unit 105, a SBEC mechanism is used to detect single bit errors in the old data, for example, in the unmodified portion of the old data. DBEC bits 112, which may be needed to generate syndrome bits 181 for single bit error correction, are not typically generated for incomplete or partial data. If a single bit error is detected, for example, in an incomplete data block from cache unit 105, it typically is not corrected and the appropriate elements of system 100 may be notified and may take appropriate action.

When data stored in cache unit 105 is read or requested by units outside cache unit 105, for example, for retirement, the data may be error checked or error corrected by an EC mechanism.

An embodiment of the present invention may include executing multiple error correction mechanisms substantially concurrently, for example, SBEC bit 108 and DBEC bit 112 generation mechanisms, or other suitable single and/or double bit error detection mechanisms. These mechanisms may execute inside the cache unit 105 as opposed to executing in the processor outside the cache unit.

The multiple EC mechanisms may execute in conjunction, at overlapping times, substantially concurrently or so that the execution of one mechanism does not depend upon the execution of another. However, the full executions of the two mechanisms are typically not precisely concurrent since the time to execute each may differ. For example, the SBEC mechanism may be used in conjunction with the DBEC mechanism. In one embodiment, the SBEC mechanism may be less computationally intensive and is executed faster than the DBEC mechanism. Although their processes may overlap in time or occur substantially concurrently, their actions are typically not synchronous.

In-line L1 EC computation in the processor 101 pipeline may cause processor computation delays. Since EC calculations may be computationally intensive, these delays may be significant. Embodiments of the present invention may avoid or reduce such delays. The multiple EC mechanisms may function in separate pipelines. For example, SBEC mechanisms and DBEC mechanism typically do not execute in a single pipeline. Each mechanism may include multiple pipelines.

In one embodiment, an EC mechanism may include an SBEC mechanism that may generate SBEC bits 108 that correspond to data, for example, a set of data bits 113, and detect single bit errors in the data. Once there is a request to read or use a set of data bits 113 from cache unit 105, the set of data bits 113 and corresponding SBEC bits 108 may be sent to a SBEC calculator 190. At the time of single bit error detection, the SBEC calculator 190 may compare the set of data bits 113 and corresponding SBEC bits 108 to detect single bit errors. In one embodiment, the SBEC bit generation mechanism may store SBEC bits 108 before the error detection mechanism uses the SBEC bits 108 to execute a comparison operation. In another embodiment, the error detection mechanism may uses the SBEC bits 108 to execute a comparison operation before SBEC bit generation mechanism may store the SBEC bits 108. The single bit error detection mechanism may determine if data has single bit errors.

If no single bit errors are detected, the SBEC mechanism may complete or communicate with or defer further error detection to another EC mechanism, for example, a DBEC mechanism.

Single bit error detection by a SBEC mechanism may execute faster than single bit error detection by a DBEC mechanism. The use of the SBEC mechanism for single bit error detection, in combination with the DBEC mechanism, may produce a faster or more efficient EC mechanism than if the DBEC mechanism detected both single and double bit errors.

If a single bit error is detected, the SBEC mechanism may communicate the error to other EC mechanisms. The SBEC mechanism may attempt to correct the error. The SBEC mechanism may include a syndrome generator 188 that may generate error correction bits, for example, syndrome bits 181 that may be used to correct single bit errors in the data to which they correspond. Syndrome generator 188 may use a set of data bits 113 and corresponding DBEC bits 112 to generate corresponding syndrome bits 181. Single bit error correction may execute before, during or after the data leaves cache unit 105 on a read request.

An EC mechanism may use syndrome bits 181 bits to correct data inside or outside cache unit 105. For example, a signal may be sent to a program or process that may execute error correction such as a micro code assist (MCA) mechanism. The MCA mechanism may attempt to execute correction, for example, as is known. Other error correction execution processes may be used. These processes may attempt to execute the single bit error correction for a set of data bits 113 using syndrome bits 181 and/or other data, for example, the set of data bits 113. The SBEC mechanism may also use data from outside the cache unit 105, such as from outside memory banks or processor 101.

In one embodiment an SBEC mechanism may execute inside cache unit 105 as opposed to processor 101 outside cache unit 105. In another embodiment an SBEC mechanism may execute in processor 101 where some operations of the mechanism execute in cache unit 105.

Data with single bit errors may be corrected before it is read by a unit in accordance with a read request, for example, from a unit in processor 101. A SBEC mechanism in cache unit 105 or in processor 101 outside the cache unit 105 may correct a single bit error in accordance with an embodiment of the present invention and continue operating. Processor 101 typically does not halt or modify or terminate its function when a single bit error is detected.

In one embodiment, an EC mechanism may include a DBEC mechanism that may detect and report double bit errors in data stored in cache unit 105 and generate the corresponding DBEC bits 112. The DBEC mechanism may operate in conjunction and substantially concurrently to a SBEC mechanism. Once there is a request to read or use data from the data bank 111, a set of data bits 113 and corresponding DBEC bits 112 may be sent to syndrome generator 188 to generate corresponding syndrome bits 181. Syndrome bits 181 may detect double bit errors in the set of data bits 113.

If no double bit errors are detected, for example, for a set of data bits 113 from the data array 111, the DBEC mechanism may complete or communicate with or defer further error detection to another EC mechanism, for example, a SBEC mechanism.

If no single or double bit errors are detected, no corrections need to be made to data read from the cache unit 105 and the data may be retired and computing system 100, processor 101 or any related system, device or operation may read the data requested. If no single bit errors are detected, but a double bit error is detected, any suitable element of computing system 100, for example, processor 101 may be affected by the DBEC mechanism. For example, error correction of the double bit errors may proceed as specified by the relevant components of system 100, for example, error correction schemes in components or programs external to cache unit 105.

In one embodiment, the DBEC mechanism may read a set of data bits 113 or corresponding DBEC bits 112 from the data array 111, and the EC array 110, respectively. A corresponding set of data bits 113, and DBEC bits 112 may be read, for example, by one or more multiplexers 160, for example a byte multiplexer and/or a way multiplexer. A syndrome generator 188 may use the set of data bits 113 or corresponding DBEC bits 112 to generate corresponding syndrome bits 181. Syndrome bits 181 may be used to detect double bit errors in a corresponding set of data bits 113.

A signal or report may be sent to a program or process that may be inside or outside the cache unit 105, for example, a micro code assist (MCA) mechanism, that may attempt to execute a double bit error correction and load retirement, for example, as is known in the prior art. A mechanism or system that reads or uses data with double bit errors from may terminate in response to the detection or signaling of the errors.

Once erroneous data or data that may correspond to the erroneous data is corrected or modified, it may be written to suitable locations inside and outside cache unit, for example, memory banks, programs, operations, or pipelines, for example the processor pipeline(s) 118. These locations may be located by identifiers, for example, tags, addresses, serialized data or any other suitable mark or location signal or program. The erroneous data or data that may correspond to, relate to or be derived from the erroneous data may be erased, modified, rewritten, deleted, or invalidated in any suitable manner. If the error correction program is located outside cache unit 105, the corrected data or a correction signal may be written to cache unit 105 to overwrite or modify the erroneous data, for example, from an external signal or source, for example, an external error correction execute program or external memory. The data may be written, for example, via the buffer array 120. If the error correction program is located inside cache unit 105, the modified data may be directly updated or stored and the erroneous data may be overwritten or modified without using signals or data from outside cache unit 105. Modified data, for example, data modified in cache unit 105, may be written outside cache unit 105 via, for example, a write back (WB) mechanism 170, for example, a snoop buffer. The modified data may be written to such memory banks before or after or at a time overlapping the time at which the modified data is written to the cache unit 105 for update in the data array 111. If the modified data is written to an external memory bank outside the cache unit 105, before it is written to the cache unit 105, the modified data may be written to the cache unit 105 from the external memory bank. The modified data that is updated may be read again and reloaded into the SBEC Correct mechanism and the cycle may repeat.

A program, unit, or system operating on or using data bits 113, in data array 111, may continue to function and typically does not terminate its function after the detection, signaling or correction of single bit errors in data in cache unit 105 or any other related function of the SBEC mechanism.

Figure 3:
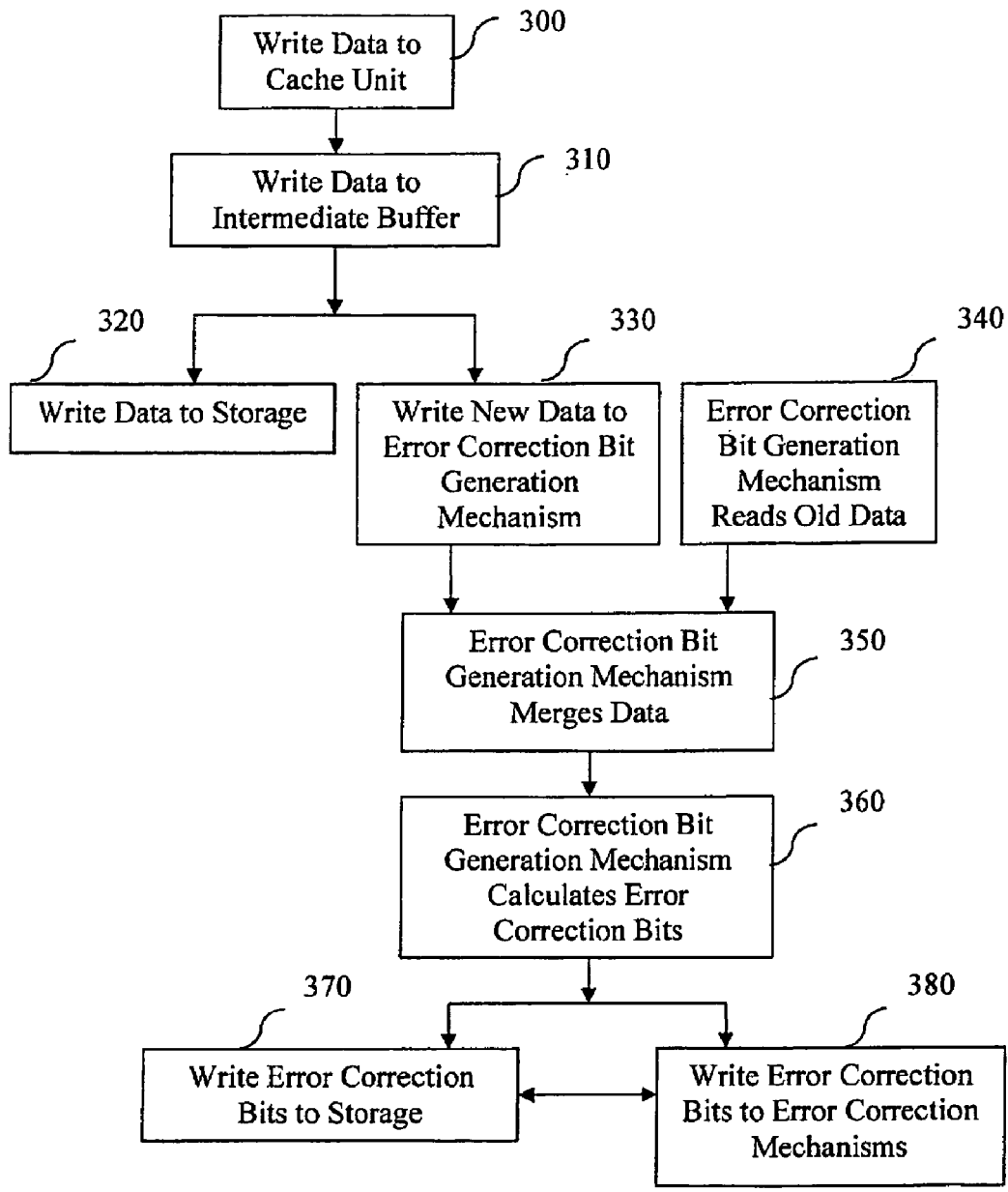
FIG. 3 is a flow diagram of a method according to a demonstrative embodiment of the present invention.

FIG. 3 is a flow chart of a method according to a demonstrative embodiment of the present invention. Data may be stored in a cache unit substantially concurrently to when an error correction mechanism reads the data, for example, from storage in the cache unit, to generate error correction data corresponding to the stored data. The data stored in the cache unit may be partially modified incomplete data.

Referring to FIG. 3, in operation 300 data may enter the cache unit. The data may enter the cache unit via, for example, a bus mechanism and may be written from the processor, an external memory bank, or any other suitable location outside the cache unit.

In operation 310, the data that enters the cache unit may be written to an intermediate buffer, for example buffer array 120. If the data is incomplete, the data may be inserted into a data block of appropriate size. An intermediate buffer need not be used.

In operation 320, the data that enters the cache unit may be written to a storage space in the cache unit, for example, data array 111. If no intermediate buffer is used, the data may be written from outside the cache unit via a bus to a storage space inside the cache unit.

In operation 330, the data that enters the cache unit may be written to an error correction bit generation mechanism. For example, data may be written via an intermediate buffer, such as buffer array 120 to an error correction bit generation mechanism. The data may be, for example, modified data corresponding to a partial store in operation 320. The EC bit generation mechanism may include, for example, DBEC calculator 180. Other units may be used.

In operation 340, an error correction bit generation mechanism may read old data from its storage location (the storage location may be overwritten by new data in operation 320). The data may be read from storage inside the cache unit and may be read to an error correction bit generation mechanism contained in the cache unit. For example the data from data array 111 may be read by the DBEC mechanism to generate DBEC bits 112. The data may be, for example, modified data corresponding to a partial store in operation 320. The error correction bit generation mechanism may include, for example, DBEC calculator 180. Other suitable error correction bit generation mechanisms may be used.

Operations 320, 330, 340 may occur substantially concurrently. If operation 310 is not skipped, then operations 320 and 330 typically occur after operation 310, but operation 340 may be executed at a time independent of the execution of operation 310.

In operation 350, data may be merged. For example, an error correction bit generation mechanism (e.g., for example, DBEC calculator 180) may merge new modified data written in operation 330 and old unmodified data read in operation 340. Other suitable error correction bit generation mechanisms may be used. The data may include data that is written in operation 330 and the data that is read in operation 340.

In operation 360 error correct bits may be calculated and generated, for example, by an error correction bit generation mechanism. Error correct bits may be DBEC bits 112 such as, for example, ECC bits. The error correction bit generation mechanism may include, for example, DBEC calculator 180. Other suitable error correction bit generation mechanisms may be used.

In operation 370 error correct bits may be written to a storage space. This storage space may be, for example, in the cache unit. The storage space may be EC array 110.

In operation 380 one or more error correction mechanisms may read the error correction bits. If there are multiple error correction mechanisms, they may function in conjunction and substantially concurrently in accordance with the present invention. The multiple error correction mechanisms may include, for example, a SBEC mechanism and a DBEC mechanism. Other suitable error correction mechanisms may be used.

If data that corresponds to the error correction bits is not read by any system other than error correction bit generation mechanism prior to operation 370, operation 370 may follow operation 360. In this case operation 380 may execute after operation 370. For example, the error correction mechanism may read the error correction bits from storage. If data that corresponds to the error correction bits is read by a system other than an error correction bit generation mechanism prior to operation 370, operation 380 may follow operation 360. For example, if operation 380 follows operation 360, an error correction mechanism reads error correction bits from an error correction bit generation mechanism. In this case, operation 370 may execute after or substantially concurrent to operation 380. For example, the same error correction bits may substantially concurrently be written to storage and read by error correction mechanisms.

In one embodiment multiple EC mechanisms may read data from a cache unit and detect and correct errors substantially concurrently, for example, by an EC mechanism. The multiple EC mechanisms may include a SBEC mechanism and a DBEC mechanism. The SBEC mechanism may be a parity error correction mechanism and the DBEC mechanism may be an ECC mechanism. Other or different EC mechanisms may be used.

In one embodiment an EC mechanism may correct errors in data read from a cache unit substantially concurrently to or prior to when the instructions that relate to that data are being processed, for example, in a processor pipeline. The EC mechanism may operate in a separate pipeline from the processor pipeline. The EC mechanism may correct errors in data read from a cache unit at a time before or during when the data is written out of the cache unit 105 for example, via a bus mechanism. The EC mechanism may correct erroneous data before it is written or read outside of the EC mechanism. The EC mechanism may be a SBEC mechanism, for example a parity EC mechanism.

Figure 4A:
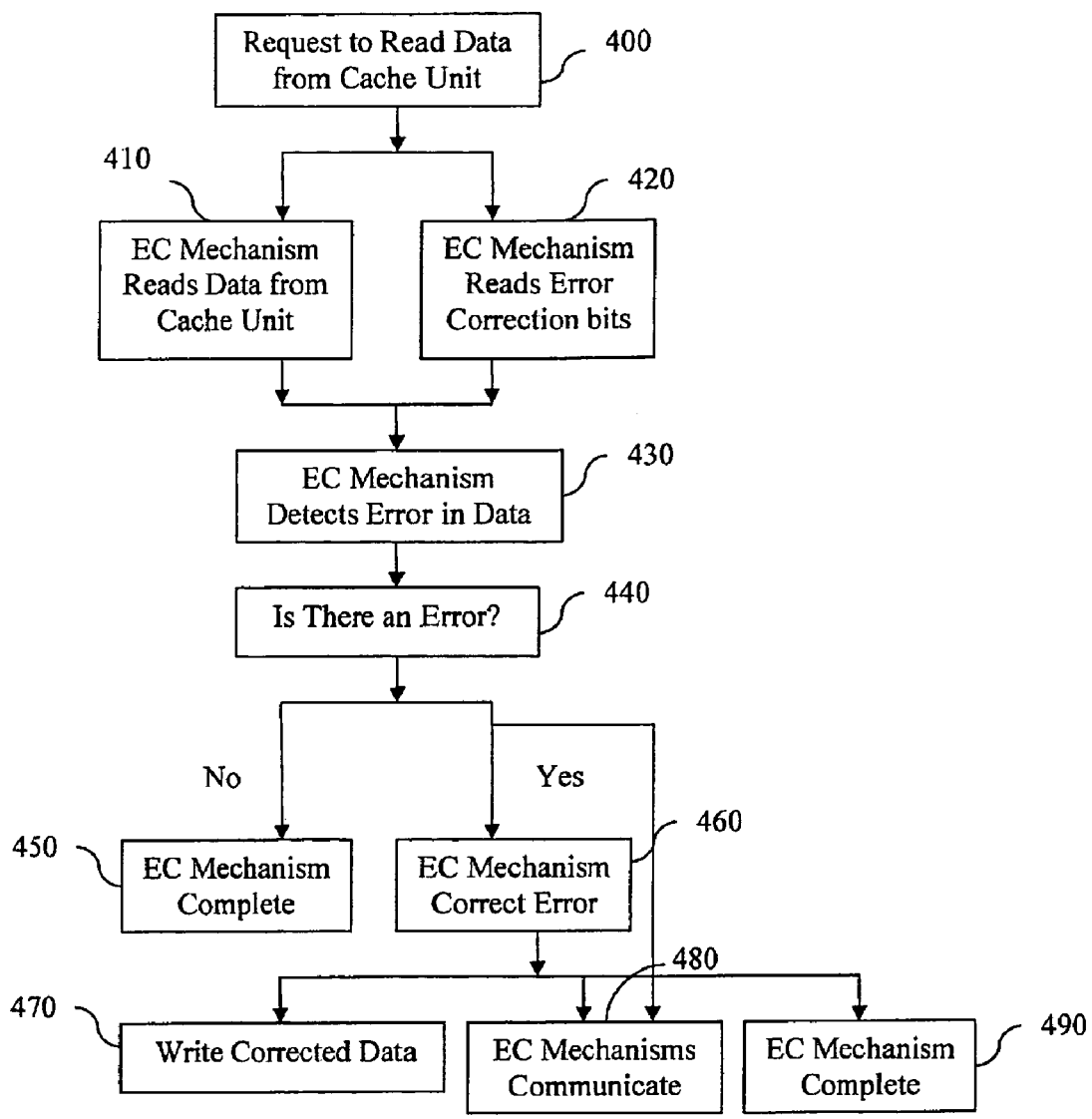
FIG. 4*a* is a flow diagram of a method according to another demonstrative embodiment of the present invention.
Figure 4B:
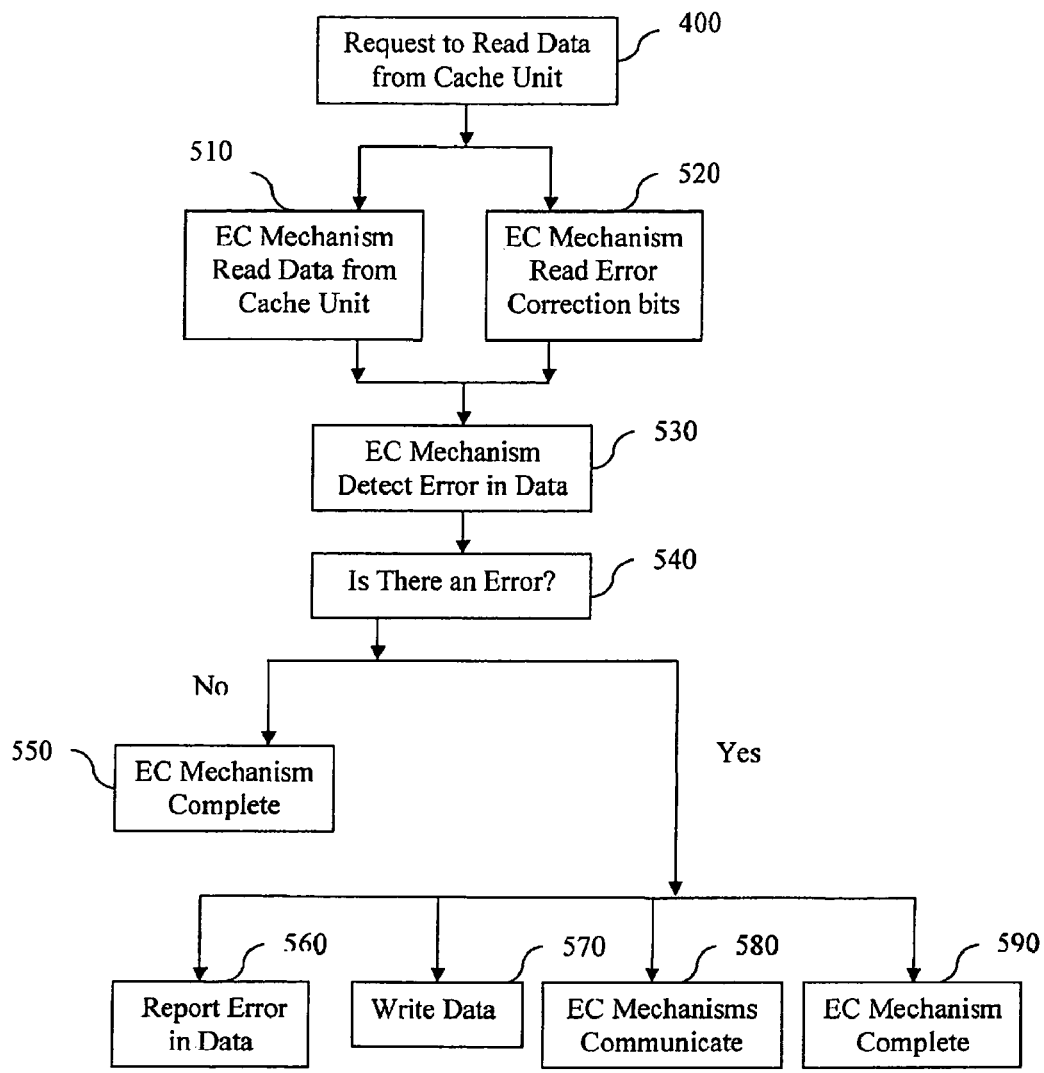
FIG. 4*b* is a flow diagram of a method according to another demonstrative embodiment of the present invention.

FIGS. 4a and 4b are flow charts of methods according to a demonstrative embodiment of the present invention, which describe EC mechanisms, for example, a SBEC mechanism and a DBEC mechanism. The EC mechanisms described in FIGS. 4a and 4b may function in conjunction and substantially concurrently. For example, both EC mechanism may detect and correct errors for the same data. Both EC mechanisms may execute in response to the same operation, for example, operation 400, a request to read data from a cache unit.

Referring to FIG. 4a, in operation 400 a system, mechanism or pipeline external to the cache unit may request to read data stored in the cache unit. For example, a processor pipeline may request to read data stored in the cache unit for use in a pipeline or operation.

In operation 410 an EC mechanism may read data from the cache unit. The data may include data bits that may be stored inside the cache unit, for example, data bits 113 stored in the data array 111. The data may be read by an element of the EC mechanism that may, for example, be inside the cache unit, such as a SBEC calculator 190.

In operation 420 an EC mechanism may read error correction bits. The error correction bits may correspond to the data read in operation 410 and may, for example, be stored with this data. The EC mechanism may for example, be capable of detecting single bit errors. The EC mechanism may be for example SBEC calculator 190, which may be located in the cache unit. The data being read may correspond to a data request that may be associated with a processor pipeline. The error correction bits may be, for example, SBEC bits, for example, parity bits.

If a read request for data from the cache precedes the storage of the corresponding EC bits, then the EC bits in operation 420 may be read directly from the error correction bit generation mechanism or an element thereof instead of from EC bit storage. If the storage of the EC bits precedes a read requested for the corresponding data, then the EC bits in operation 420 may be read from storage.

Operation 410 and operation 420 may be executed substantially concurrently, independent of the timing of the other, or either operation may precede the other. If the data bits read in operation 410 are stored in the cache unit with their corresponding error correction bits, both the data and the error correction bits may be read in a single pipeline and operation 410 and operation 420 may be considered to be executed at exactly the same time.

In operation 430, an element of an EC mechanism may execute an error detection mechanism that may detect errors, for example, single bit errors, in data read in operation 410. The error detection mechanism may detect single bit errors, for example, using SBEC calculator 190. SBEC calculator 190 may execute a comparison mechanism using data read in operation 410 and EC bits read in operation 420, for example, SBEC bits 108, to detect single bit errors in the data. Error detection mechanisms may be located in a cache unit in a processor.

In operation 440, if the error detection mechanism of operation 430 detects no errors in data read in operation 410, the EC mechanism may execute operation 450. In operation 450, the EC mechanism completes. Completion may include for example terminating specific error detection or correction mechanisms for the data read in operation 410. Completion may include deferring further error detection to another EC mechanism that may operate in conjunction, for example deferring double bit error detection for the data read in operation 410 to the DBEC mechanism. Completion may include reloading the EC mechanism, for example, as depicted in FIG. 4a by returning to operation 400 or operation 410, for example, rereading data in the cache unit, for example, from a specific storage location that may be prompted by results of a previous or substantially concurrent error correction operation. This data may be modified or unmodified data and for example, may correspond to a specific storage location in the cache unit that may be located or indicated by an indicator or tag of the data or by some other program or mechanism. Completion may include writing, signaling or communicating the result of operation 430, 440 or 450 to any suitable program or system or memory bank or storage unit.

In operation 440, if an error is detected in operation 430, the EC mechanism may proceed to operation 460. In operation 460 errors in the data read in operation 410 may be corrected in accordance with an embodiment of the present invention. Errors may be corrected by, for example, an EC mechanism which include, for example, a syndrome generator which may generate data that may be used to correct single bit errors, for example, syndrome bits 181. The EC mechanism may use syndrome bits to correct data inside or outside the cache unit, for example, by the MCA mechanism. Error correction may occur before, during or after data is written from the cache unit. Error correction may occur before the data is read by the system or mechanism or pipeline that requested the data in operation 400. The erroneous data and data that may correspond to erroneous data may be corrected by modification of any suitable form that may be specified by the EC mechanism or any suitable system or program. The EC mechanism may use any other suitable error correction data or mechanisms that may be inside or outside the cache unit to correct the data.

In operation 440, if an error is detected in operation 430, operation 480 may occur prior to or substantially concurrently to operation 460. In operation 480, the EC mechanism may report to another EC mechanism that an error was found in the data requested to be read in operation 400. The mechanisms may include a priority definition that may give one of the mechanisms control over error detection. The EC mechanism with priority may typically be the least computationally intensive of the EC mechanisms. This may prevent unnecessary error correction to increase processor efficiency.

In operation 470, data that may relate to data read in operation 410 may be written, where the data may be modified or corrected from erroneous data or may be used to modify erroneous data by the EC mechanism or may relate to erroneous data. The data may be for example a tag or indicator for modification of data read in operation 410. The data may be written to pipelines, mechanisms, program units, external memory banks, the local cache unit or any other suitable place that relates to the erroneous data read in operation 410. Indicators may reveal the locations of the suitable places that relate to the data.

The data may be written, for example, directly back to storage in the cache unit, for example, the storage space where the data was read from in operation 410. This data may be written outside the cache unit, for example, via a bus mechanism. This data may be written outside the cache unit to be read by a system or mechanism or pipeline that requested the data in operation 400. This data may be written outside the cache unit, for example, to complete the EC mechanism, or to update an external memory bank or any other storage unit that may have data that corresponds to or relates to the data read in operation 410 such as the main memory. The data may be written outside the cache unit, for example, directly to the processor pipeline, which may use the corrected data. The data may be written to any other suitable location outside the cache unit. The data may be written to any and all of these locations substantially concurrently or in any order.

If data from the cache is requested in operation 400, for example, for use the processor pipeline, the data may be corrected substantially concurrently to the function of that pipeline. The pipeline may request data from the cache unit in operation 400, for example, as soon as it can anticipate that the pipeline may use the data. If the request is sent to the cache unit in operation 400, the requested data may be corrected before or substantially concurrently to the operation of the processor pipeline that uses the data. The requested data may have a place holder in the pipeline, where the error corrected data may be inserted upon completion of the EC mechanism. Thus the data requested by the pipeline in operation 400 may be error corrected substantially concurrently to the operation of that pipeline. If the requested data is essential to the progress of the pipeline, the pipeline may wait for the EC mechanism to complete operation 470 and write the error corrected data to the pipeline. The error corrected data does not need to be updated to storage before it is used in a pipeline.

In operation 480 the results of the EC mechanism or data from the EC mechanism may be sent another EC mechanism. The communication may modify the actions of other EC mechanisms. For example, if an error is detected by one EC mechanism, the data may be modified, invalidated or overwritten according to the specifications of that mechanism. That EC mechanism may signal the other EC mechanisms, for example, to ignore that data or data location or stall execution of other EC mechanisms until the erroneous data may be modified. Any other suitable communication between EC mechanisms may occur.

In operation 490, the EC mechanism may complete. Completion may include any of the operations specified in operation 450.

Operation 470, operation 480 and operation 490 may be executed substantially concurrently or independent of each others timing.

Referring to FIG. 4b, in operation 400 a system, mechanism or pipeline external to a cache unit may request data stored in the cache. For example, a processor pipeline may request data stored in a cache unit. Operation 400 of FIG. 4a may execute substantially concurrently to, and may be the same operation as operation 400 of FIG. 4b.

In operation 510 an EC mechanism may read data from the cache unit. The data may include data bits that may be stored inside the cache unit, for example, data bits 113 stored in the data array 111. The data may be read by an element of the EC mechanism that may, for example, be inside the cache unit, such as a DBEC calculator 180. The data read may be the data or relate to the data read in operation 410. Operation 510 may execute substantially concurrently to, or at a time independent of, operation 410.

In operation 520 an EC mechanism may read EC bits. The EC bits may correspond to the data read in operation 510. The EC bits may be DBEC bits 112, for example, ECC bits. The EC bits may be stored in the cache unit, for example, separate from the data read in operation 510, for example in an EC array 110. The error correction bits may be read, for example, by an element of the EC mechanism that may for example, be capable of detecting errors in data that may be, for example, in the cache unit, for example syndrome generator 188. The data read may correspond to data requested in operation 400 that may be associated with an operation in processor pipeline.

If the read request of operation 400, for data from the cache, precedes the storage of the corresponding EC bits, then the EC bits in operation 520 may be read directly from the error correction bit generation mechanism or an element thereof instead of from EC bit storage. If the storage of the EC bits precedes the read requested, of operation 400, for the corresponding data, then the EC bits in operation 520 may be read from EC bit storage.

Operations 510 and 520 may be executed substantially concurrently or independent of the timing of the other, or either operation may precede the other.

In operation 530, an EC mechanism may execute an error detection mechanism that may detect double bit errors in the data read in operation 510. The EC mechanism may include syndrome generator 188. Syndrome generator 188 may read, accept or use the data read in operation 510 and the corresponding EC bits read in operation 520, to generate corresponding syndrome bits 181. The EC mechanism may use syndrome bits 181 to detect double bite errors in the data read in operation 510. Error detection mechanisms may be located in a cache unit in a processor.

Operation 430 of FIG. 4a and operation 530 of FIG. 4b may occur substantially concurrently. For example, multiple error detection mechanisms may execute substantially concurrently. In one embodiment, single bit error detection and double bit error detection may execute on an entry or data substantially concurrently.

In operation 540, if no double bit errors are detected in operation 530, operation 550 may be executed. In operation 550, the EC mechanism may complete. Completion may include for example retirement or terminating specific error detection or correction mechanisms for the data read in operation 510. Completion may include deferring further error detection to another EC mechanism that may operate in conjunction, for example deferring single bit error detection for the data read in operation 510 to the SBEC mechanism. Completion may include reloading an EC mechanism with functionality depicted in FIG. 4b by returning to operation 400, operation 510 or operation 520. Completion may include writing or communicating the result of operation 550 to a program, system or memory bank or storage unit.

If an error is detected, operation 560 may execute. In operation 560 double bit errors in the data read in operation 510 may be reported to any suitable system or mechanism. The erroneous data and data that may relate to the erroneous data may be corrected or modified or invalidated or erased. Any system or program or mechanism or operation that may have or may currently be using the erroneous data may respond to the error as specified by the operation or by directions external to the operation.

In operation 570, data that may relate to data read in operation 510 may be written, where the data may be modified or corrected from erroneous data or may be used to modify erroneous data by the EC mechanism. The data may be a signal or a tag or indicator for modification of data that may relate to data read in operation 510. The data may be written to pipelines, mechanisms, program units, external memory banks, the local cache unit or any other suitable place that relates to the erroneous data read in operation 510. An indicator may reveal the locations of the suitable places that relate to the data.

In operation 580, an EC mechanism may communicate with other EC mechanisms. For example, the EC mechanism may accept signals or data from other EC mechanisms, which may alter the function of the EC mechanism. Such communication may include the functionality of operation 480 (FIG. 4a). Operation 580 may execute prior to, substantially concurrently to or independent of the timing of other operations of the present EC mechanism, for example, operations 400, 510-570 and 590 (FIG. 4b). However, operation 580 may affect the execution of these operations.

In operation 590, the EC mechanism may complete. Completion may include, for example, any of the operations specified in operation 550.

Other operations or series of operations may be used.

The foregoing description of the embodiments of the invention has been presented for the purposes of illustration and description. It is not intended to be exhaustive or to limit embodiments of the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of embodiments of the invention.

The invention claimed is:

1. A method, comprising:
   storing a first set of data in a data array in a cache unit;
   concurrently reading a second set of data from the data array; and
   executing, via multiple concurrent pipelines, two or more error correction mechanisms for the first set of data concurrently;
   wherein at least the second set of data is used to generate error correction data corresponding to the first set of data and wherein a third set of data is to be generated based on the generated error correction data.

2. The method of claim 1 wherein the error correction data comprises double bit error correction data.

3. The method of claim 1 wherein the error correction data comprises single bit error correction data.

4. The method of claim 1 comprising storing the error correction data in the cache unit outside the data array.

5. The method of claim 1 wherein storing the first set of data in the data array comprises partially filling a width of a fixed data block in the data array with said first set of data.

6. The method of claim 5 wherein reading the second set of data comprises reading old data from a remainder of the width of the fixed data block that does not include said first set of data.

7. The method of claim 1, wherein the two or more error correction mechanisms comprise at least a single bit error correction mechanism and a double bit error correction mechanism.

8. The method of claim 1, comprising performing error correction within the cache unit.

9. The method of claim 1, further comprising generating one or more syndrome bits, wherein a single bit error is to be corrected based on the one or more syndrome bits.

10. An apparatus comprising:
    a processor having a cache unit including a data array to store a first set of data, wherein the cache unit is able to read a second set of data from the data array concurrently with storing said first set of data, to execute, via multiple concurrent pipelines, two or more error correction mechanisms for the first set of data concurrently, and to use at least the second set of data to generate error correction data corresponding to the first set of data, wherein a third set of data is to be generated based on the generated error correction data.

11. The apparatus of claim 10 wherein the error correction data comprises double bit error correction data.

12. The apparatus of claim 10 wherein the error correction data comprises single bit error correction data.

13. The apparatus of claim 10 wherein the cache unit comprises an error correction array to store the error correction data inside the cache unit outside the data array.

14. The apparatus of claim 10 wherein the first set of data partially fills a width of a fixed data block in the data array.

15. The apparatus of claim 14 wherein a remainder of the width of the fixed data block includes at least old data, and wherein the second set of data includes at least part of the old data.

16. The apparatus of claim 10, wherein the two or more error correction mechanisms comprise at least a single bit error correction mechanism and a double bit error correction mechanism.

17. The apparatus of claim 10, wherein the cache unit is able to execute at least one of the two or more error correction mechanisms.

18. The apparatus of claim 10, further comprising a syndrome generator to generate one or more syndrome bits, wherein a single bit error is to be corrected based on the one or more syndrome bits.

19. A system comprising:
a processor having a cache unit including a data array to store a first set of data, wherein the cache unit is to read a second set of data from the data array concurrently with storing said first set of data, to execute, via multiple concurrent pipelines, two or more error correction mechanisms for the first set of data concurrently, and to use at least the second set of data to generate error correction data corresponding to the first set of data, wherein a third set of data is to be generated based on the generated error correction data.

20. The system of claim 19 wherein the error correction data comprises double bit error correction data.

21. The system of claim 19 wherein the error correction data comprises single bit error correction data.

22. The system of claim 19 wherein the cache unit comprises an error correction array to store the error correction data inside the cache unit outside the data array.

23. The system of claim 19 wherein the first set of data partially fills a width of a fixed data block in the data array.

24. The system of claim 23 wherein a remainder of the width of the fixed data block includes at least old data, and wherein the second set of data includes at least part of the old data.

25. The system of claim 19, wherein the two or more error correction mechanisms comprise at least a single bit error correction mechanism and a double bit error correction mechanism.

26. The system of claim 19, wherein the cache unit is able to execute at least one of the two or more error correction mechanisms.

27. The system of claim 19, further comprising a dynamic random access memory unit external to the processor.

28. The system of claim 19, further comprising a syndrome generator to generate one or more syndrome bits, wherein a single bit error is to be corrected based on the one or more syndrome bits.

* * * * *